United States Patent [19]
Strieber

[11] Patent Number: 6,042,240
[45] Date of Patent: Mar. 28, 2000

[54] ADJUSTABLE THREE DIMENSIONAL FOCAL LENGTH TRACKING REFLECTOR ARRAY

[76] Inventor: Louis Charles Strieber, 6800 W. Gate Blvd., #139B316, Austin, Tex. 78745

[21] Appl. No.: 08/987,738

[22] Filed: Dec. 9, 1997

Related U.S. Application Data

[60] Provisional application No. 60/038,675, Feb. 20, 1997.
[51] Int. Cl.$^7$ ................................. G02B 5/08; F24J 2/16; B64G 1/00; B64G 1/28
[52] U.S. Cl. ........................... 359/851; 855/857; 855/865; 855/556; 126/685; 126/687; 244/158 R; 244/165
[58] Field of Search ...................................... 359/850, 851, 359/852, 853, 854, 855, 856, 857, 865, 872, 554, 555, 556; 126/685, 687, 688, 696; 244/158 R, 165

[56] References Cited

U.S. PATENT DOCUMENTS

| | | | |
|---|---|---|---|
| 707,982 | 8/1902 | Taylor | 359/851 |
| 1,200,346 | 10/1916 | Harvey | 359/851 |
| 3,552,216 | 1/1971 | Pasquet | 359/556 |
| 3,629,959 | 12/1971 | Essonne et al. | 359/556 |
| 4,110,009 | 8/1978 | Bunch . | |
| 4,116,539 | 9/1978 | Evans | 359/581 |
| 4,130,109 | 12/1978 | Brueck | 359/851 |
| 4,136,674 | 1/1979 | Korr . | |
| 4,218,114 | 8/1980 | Bunch . | |
| 4,249,520 | 2/1981 | Orillion . | |
| 4,266,530 | 5/1981 | Steadman . | |
| 4,491,397 | 1/1985 | Barthelat et al. | 359/555 |
| 4,586,488 | 5/1986 | Noto . | |
| 4,747,567 | 5/1988 | Johnson et al. . | |
| 4,832,002 | 5/1989 | Medina . | |
| 4,883,347 | 11/1989 | Fritzel | 359/555 |
| 4,968,355 | 11/1990 | Johnson | 359/852 |
| 4,999,059 | 3/1991 | Bagno . | |

OTHER PUBLICATIONS

Alpert, M., "Killing Asteroids," *Popular Mechanics*, Apr. 1997, pp. 40–43.

*Primary Examiner*—Ricky D. Shafer

[57] ABSTRACT

A reflector for focusing sunlight upon a single location. The reflector is preferably positioned in orbit about a celestial body to focus sunlight on objects such as space debris to heat up and vaporize such debris. The reflector includes a plurality of units in an array, with each of the units including a plurality of subunits. Each of the units rotates about a first axis and each of the subunits is tiltable about a second axis which is perpendicular to the second axis. A reflecting surface is mounted on each of the subunits such that the reflecting surface rotates with its respective unit and tilts with its respective subunit. Such rotation and tilting permits sunlight to be directed theoretically anywhere on one side of a plane. Each of the units and each of the subunits is independently controllable, and this permits each of the units directs sunlight to a single location onto a single object, which then heats up rapidly to a relatively great temperature until it vaporizes under the intense heat. A second reflecting structure having a massive flat planar reflecting surface may be positioned off to the rear side of the array to reflect sunlight onto the rear side. The rearwardly directed sunlight may then be focused by the reflecting surfaces of the units since the array is one unit thick and since the reflecting surfaces rotate into and out of front and rear positions. Accordingly, this second reflecting structure permits sunlight to be focused behind the array.

14 Claims, 15 Drawing Sheets

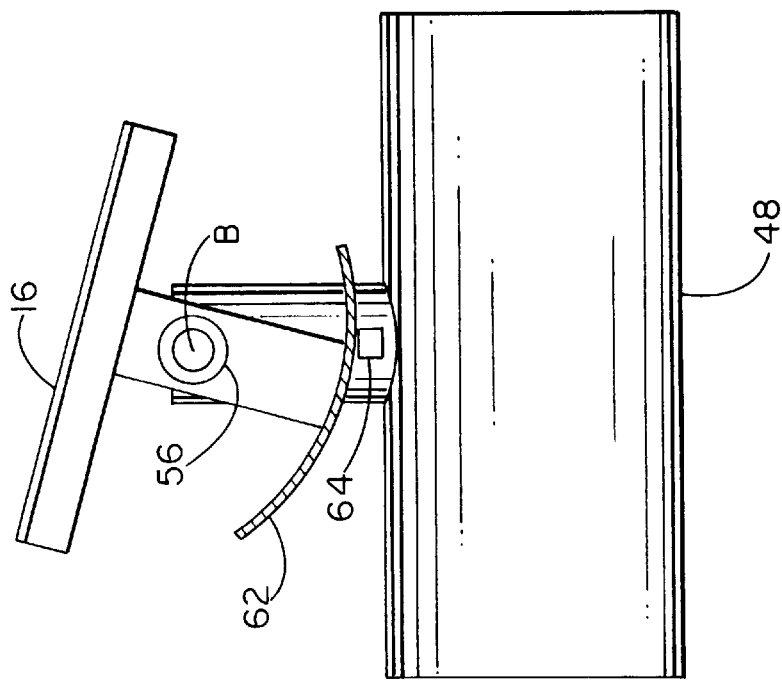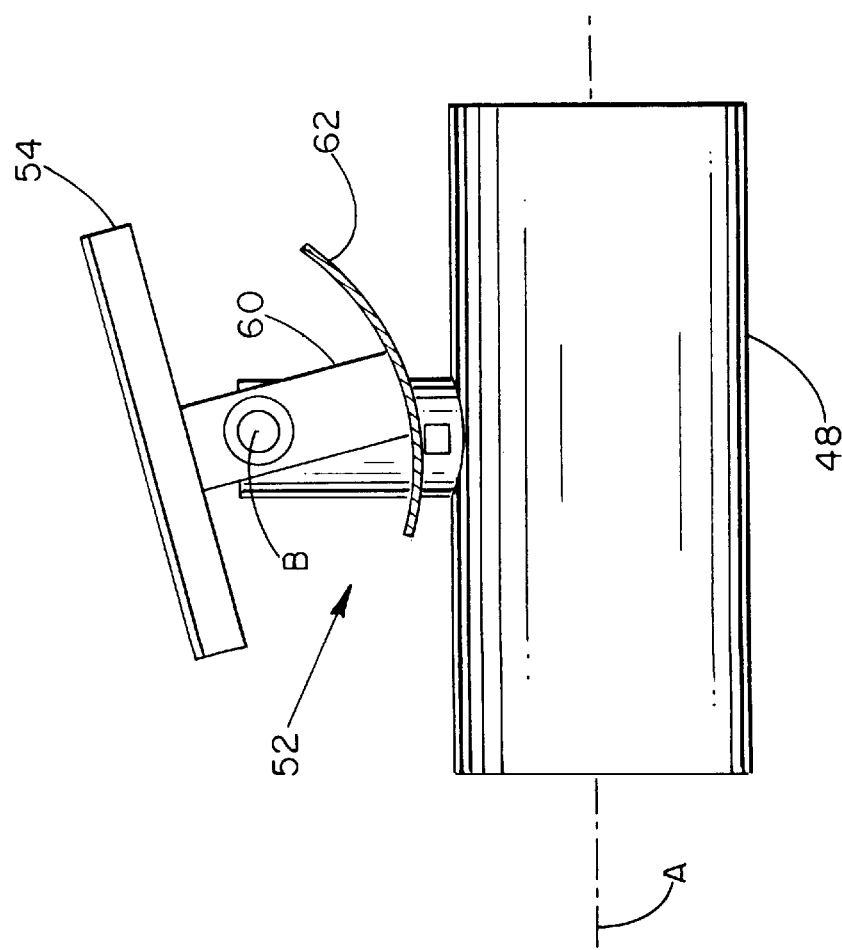
Fig.-5A
Fig.-5A

TOP VIEW (TRACKING)

Fig.-12 TOP VIEW

Fig.-13 SIDE VIEW

ADJUSTABLE THREE DIMENSIONAL FOCAL LENGTH TRACKING REFLECTOR ARRAY

This application claims the benefit under Title 35, United States Code § 119(e) of the U.S. provisional application No. 60/038,675 filed Feb. 20, 1997 and entitled Adjustable Parabolic Reflector. Such provisional application No. 60/038,675 is hereby incorporated by reference in its entirety into this application.

SUMMARY OF THE INVENTION

A general object of the present invention is to provide a unique reflecting unit. The reflecting unit is rotatable about a first axis and includes a set of reflecting subunits arranged about the first axis such that each of the reflecting subunits includes a spoke or support radiating from the first axis. Each of the subunits includes a second axis generally perpendicular to the first axis, and each of the subunits is tiltable about this second axis. A reflecting surface is disposed on each of the subunits and faces outwardly relative to the axis such that rotation of the reflecting unit about the first axis changes an impingement angle of sunlight on the reflecting surfaces facing the sun and such that tilting of each of the subunits further changes the impingement angle of sunlight on the reflecting surfaces facing the sun. Each of the subunits is independently controllable such that each of the reflecting surfaces is independently tiltable relative to each of the other reflecting surfaces. The reflecting surfaces generally form a periphery about the reflecting unit.

Another general object of the present invention is to provide an array of such reflecting units. Each of the reflecting units is independently controllable such that each of the reflecting units is independently rotatable and each of the reflecting subunits within each of the reflecting units is independently tiltable.

Another general object of the present invention is to provide a relatively large reflective structure separate and apart from the such array of reflecting units. This relatively large reflective structure may be about the size of the array and is offset from a line between the array and the sun such that a planar reflective face of the reflective structure may reflect sunlight onto a rear side of the array such that sunlight may be focused onto a single and trackable location behind the array.

Another object of the present invention is to provide a reflecting unit which uniquely produces no net forces. In particular, each of the reflecting subunits of such unit is independently rotatable about a main axis as well as being independently tiltable about another axis. Hence, where one subunit is rotated in one direction, the other subunit at the same time is preferably rotated in the other direction to produce no net forces and keep the array stabilized. Likewise, where the reflecting surface of one subunit is tilted in one direction, the other paired subunit will tilt in the other direction to produce no net forces and keep the array stabilized.

An advantage of the present invention is that light, and thus heat, can be concentrated on articles in space. A relatively little amount of light, and thus heat, may be focused on an article to free a frozen mechanism Or a relatively great amount of light, and thus heat, may be focused on an article over a period of time to break apart such article and send it out of orbit so that such an article will break into even smaller pieces when it reenters the earth's atmosphere and hence be less dangerous, if not vaporized, before it would pose a danger.

Another advantage is that articles in space may be vaporized even before entering the earth's atmosphere. Since the invention focuses such a great amount of light, and since the invention tracks the article over a period of time, it is believed that vaporizing temperatures may be attainable.

Another advantage is that portions of asteroids may be vaporized so as to alter the trajectory of an asteroid. As a portion of the asteroid is vaporized, such vaporization may act like a rocket thruster so as to change the trajectory of the asteroid. Even if portions cannot be vaporized, it is believed that sufficient light, and thus heat, can be fed to the asteroid so as to change the surface temperature of the asteroid causing the vapors to act as a rocket, thus altering the asteroid's trajectory.

Another advantage is that the present invention may have applications on the surface of a planet such as Earth. For example, heat may be partially concentrated on an area the size of an airport or harbor, aiding in the evaporation of snow and ice. Or intense light may be concentrated over time to remove surface material by vaporizing the sand and dirt and rocks. It is believed that canals may be may be "dug" by vaporizing the earth to permit interior deserts to be flooded with sea water. Further, natural disasters may be attacked on a large scale. For instance, volcanic emissions may be minimized by concentrating light and heat on the emissions so as to burn the emissions completely—and thus cleanly.

Another advantage relates to national defense. Intercontinental ballistic missiles may be tracked and heated up with highly concentrated light so as to vaporize the missiles over the country which launched the missiles.

In other words, the present invention is an array of rotating focusable reflecting surfaces that are adjustable perpendicularly along the rotating axis to accommodate tracking of objects in three dimensions. This means that the individual rotating axis rotates individually and at variable speeds in order to allow concentration of the suns reflected heat in three dimensions (focusing). Additionally, each of the reflected surfaces are individually controlled for the same reason to allow for three dimensional concentration of the reflected heat and light from the sun. This is necessary to track the space debris, or other objects to be vaporized. In order to visualize this three dimensional concentration of heat or focusing of the heat it can be assumed that the distance from on edge of the array to the other opposite edge is large. As opposite reflecting surfaces change their reflecting angles relative to the sun perpendicularly along the rotating long axis and towards each other, the concentration point moves into or away from the array. As the long axis rotates a similar action occurs across the width of the array. Therefore, there is the three dimensional tracking concentration capability of the sun's reflected heat from the array.

Because the distances are so great, the rotational velocities of the elements are modest, thus requiring extreme precision. Computers with communication with the triangulating radar would provide the input for such accuracy.

The primary parts are the reflecting surfaces, their rotating mechanisms, their tracking adjustment means, and their tracking means. Additionally, there are stabilizing means (gyroscopes) and the frame work on which the mechanism is mounted. Solar collectors are used to power the electric devices that provide all the movement in the operation of the invention. Solar collectors also power the radar.

It should be noted that narrowing the reflector pivot and narrowing the pivot itself enhances the accuracy and reduces the costs of production and shipping into orbit. The adjustment means may be mounted on the pivot support with the adjustment arm relocated accordingly at the maximum distance possible from the pivot.

Additionally, the connection of the adjustment means to the reflector at other locations such as the edge does not alter the outcome of the desired results.

Still further, it should be noted that the greater the distance the adjustment means has from the reflecting surface, the easier it is to obtain greater accuracy in aiming the reflectors. This distance can be effectively lengthened by reduction gears between the actuation motor and the adjustment arm, or its equivalent. Please note all drawings are designed only as illustrations of desired motions. The actual supports will most likely be more erector set like in form in order to reduce weight and thereby cost.

The reflecting surface can be flexible to accommodate the heat changes that occur as each surface rotates into and out of the sun's rays. If the reflecting surface also has to focus parabolically there are larger amounts of flexibility required along with support which bends in directions that produce parabolic shapes over the distance used for focusing.

The use of flat mirrors may be cheaper due to ease of manufacturing and relay into space, not to mention fewer parts.

The mounts for the reflecting surfaces are designed to accommodate the above motions and the motions of the reflecting surfaces needed to aim and track in three dimensions. Also, there may be multiple object tracking in order to reduce the oscillations of the entire structure as the mechanism picks a new object to track. Such oscillations are caused by the physical reactions of the entire structure as the velocities of the parts change. For every action, there is an equal and opposite reaction. Gyroscopes are used to keep the structure stable in space.

The primary purpose of this invention is to vaporize space debris. It has several other applications including pollution control (combusting volcanic emissions) and industrial wastes, earth moving, climate modifications (canal digging into the interior deserts for flooding part with water including sea water), and intercontinental ballistic defense along with other natural space hazards such as asteroid collision with earth or defense from asteroid modification of earth's orbit through vaporizing part of an asteroid thus jettisoning material like a rocket so as to change the trajectory of the asteroid.

The present invention tracks objects with radar, and the mathematics behind such may be complex, yet the invention is simple. The concept behind the present invention is similar to that which has been developed for high speed photography (rotating mirrors). The differences in the design between the high speed photography and the space debris vaporizer involve primarily the size and adjustability of the focal point and the variability of the speed of the rotation of the mirrors, and the variable tracking motions of the mirrors, and consequently the number of mirrors, Additionally, there are radar emitters used in triangulating the tracked objects' motions. Also there are computers used to coordinate these motions. Additionally, there are gyroscopic stabilizers used to counteract the effects of varying the rotational velocity and adjusting the tracking point to follow the object being vaporized, and focusing on the object. Additionally, vibrations are created when a new object is selected to be vaporized. As of yet there has been no determination of the prior art of using separate gyroscopes in space for stabilizing large structures. Telecommunication satellites are designed to spin in order to provide gyroscopic stabilization.

Additionally, there is the option of adding large separate flat mirror arrays that can be used to increase the power and also the directions available for the vaporization of objects.

In the event that focusing parabolic reflectors are too expensive, flat mirrors will function equally well as they are aimable just as accurately as the parabolic reflectors are over the large cumulative surface area of the entire reflector. The size of the individual mirrors determines the size of the space around the object being vaporized that is heated and allowed for, for inaccuracies in tracking. Additionally, a second means for heating larger area in space than the surface of the individual mirrors, is to adjust some of the mirrors to reflect their light and heat adjacent to the primary area of vaporization thus compensating for tracking inaccuracies and the possible expansion of the vaporizing object due to breakup.

These and further objects, features and advantages of the present invention will become clearer in light of the following detailed description of the illustrative embodiments of this invention described in connection with the drawings.

BRIEF DESCRIPTION OF THE DRAWINGS

FIG. 5A shows a side view of the reflecting subunit of FIG. 4.

FIG. 5B shows a side view of the reflecting subunit of FIG. 4 and shows how such tilts when compared to FIG. 5A.

All Figures are drawn for ease of explanation of the basic teachings of the present invention only; the extensions of the Figures with respect to number, position, relationship, and dimensions of the parts to form the preferred embodiment will be explained or will be within the skill of the art after the following description has been read and understood. Further, the exact dimensions and dimensional proportions to conform to specific force, weight, strength, and similar requirements will likewise be within the skill of the art after the following description has been read and understood.

DESCRIPTION

Figure 1:
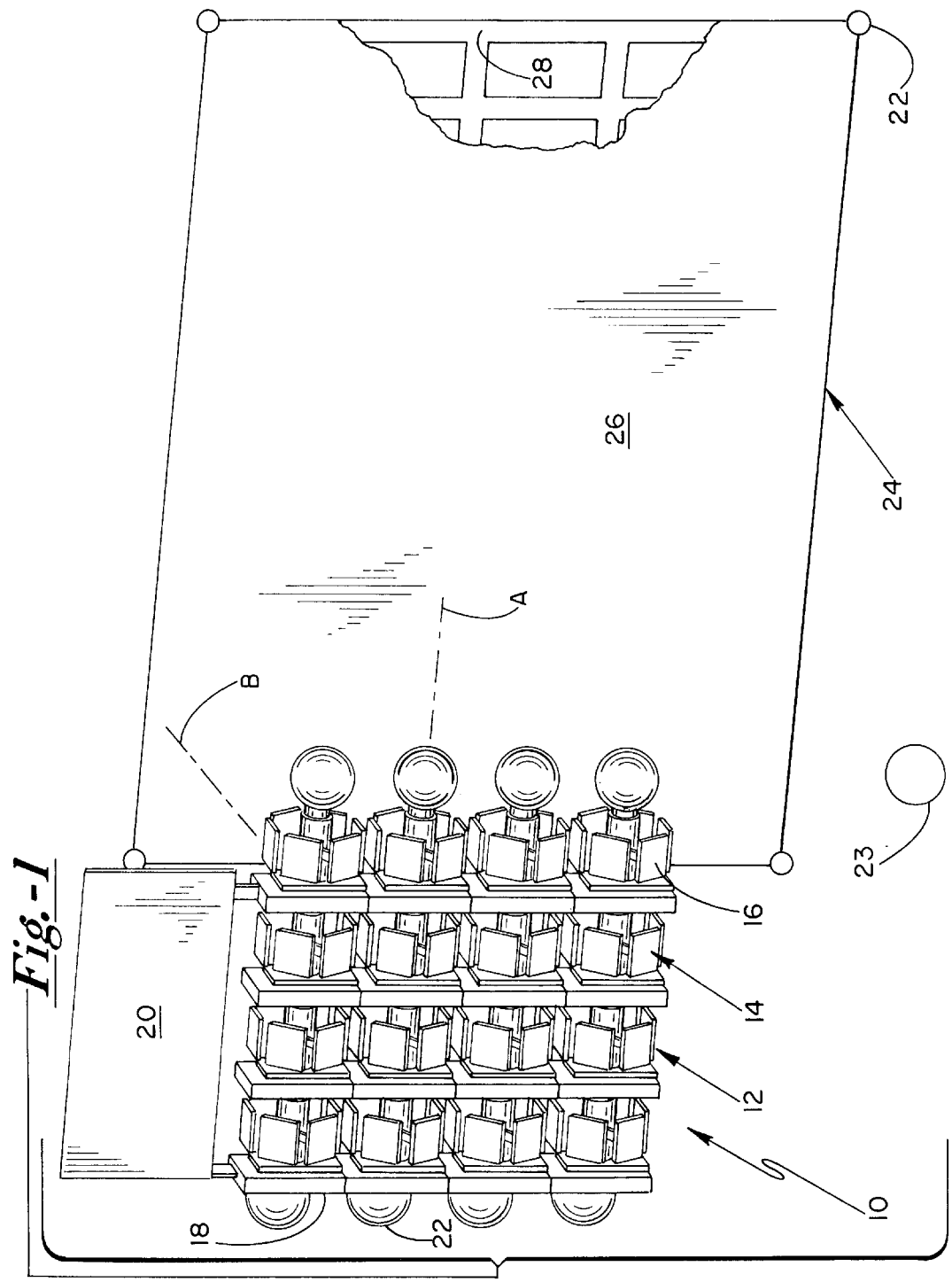
FIG. 1 shows a partially schematic, partially perspective view of the present reflecting apparatus, including the reflecting array and the backlighting or secondary reflecting structure or reflector.

As shown partially schematically and partially in perspective in FIG. 1, the present invention includes a reflecting array 10 which in general includes a plurality of reflecting units 12, each of which in turn includes a plurality of reflecting subunits 14, each of which includes a reflecting surface 16. The array 10 further includes a framework 18 for the reflecting units 12, a solar collector 20 for providing power for the array 10, and gyroscopes 22 for stabilizing the array 10. Reference numeral 23 indicates the sun.

The present invention further includes, as schematically represented in FIG. 1, a secondary or backlighting reflective structure 24. Secondary reflective structure 24 includes a reflective surface 26 and a framework 28. The secondary reflective surface 26 reflects light from the sun to a rear portion of the array 10 to increase the area in space to which the array 10 can focus light. At each of its corners, the secondary reflective structure 24 includes stabilizing gyroscopes 22.

Figure 2:
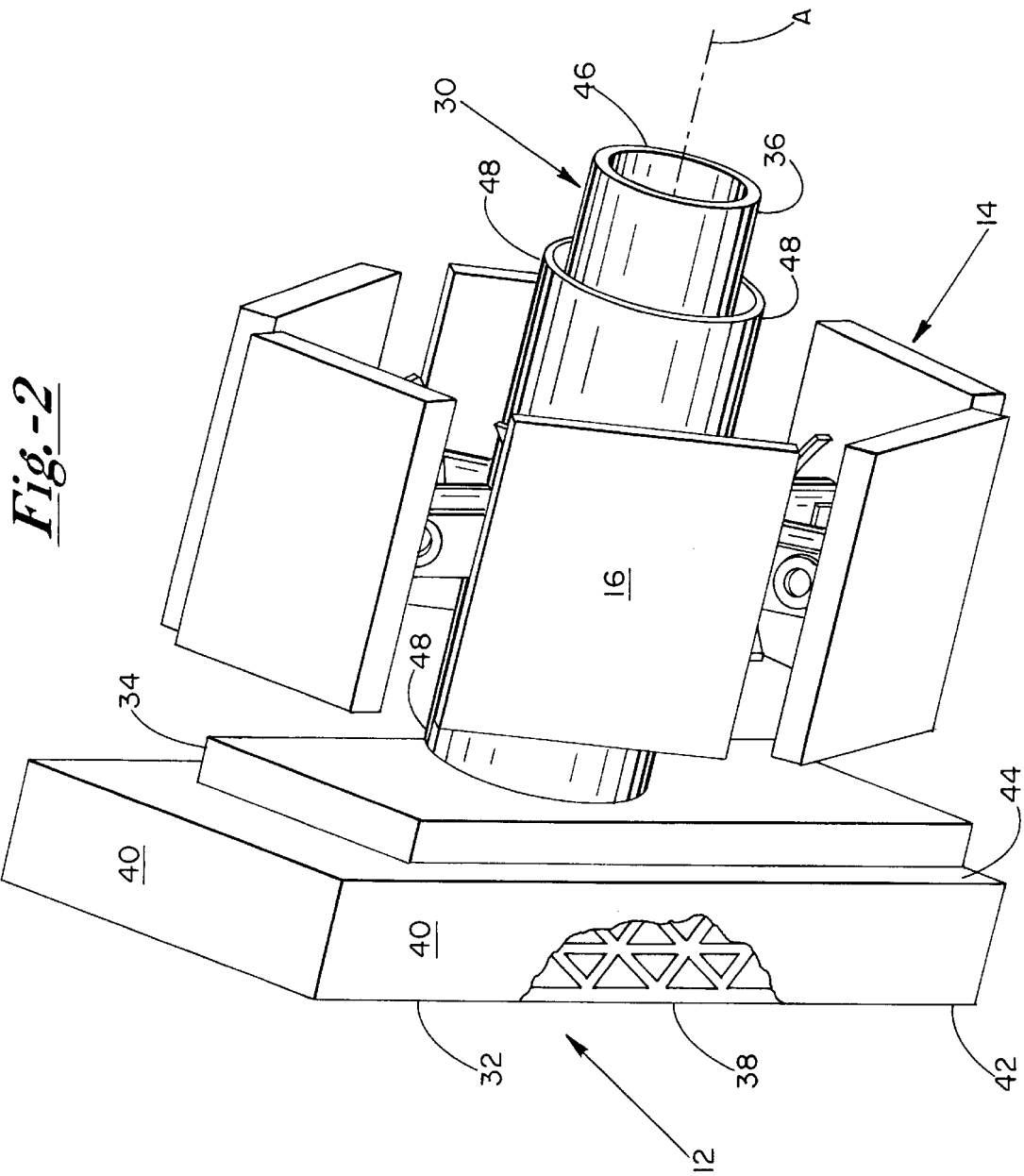
FIG. 2 shows a perspective view of a reflecting unit of the reflecting array of FIG. 1.
Figure 3:
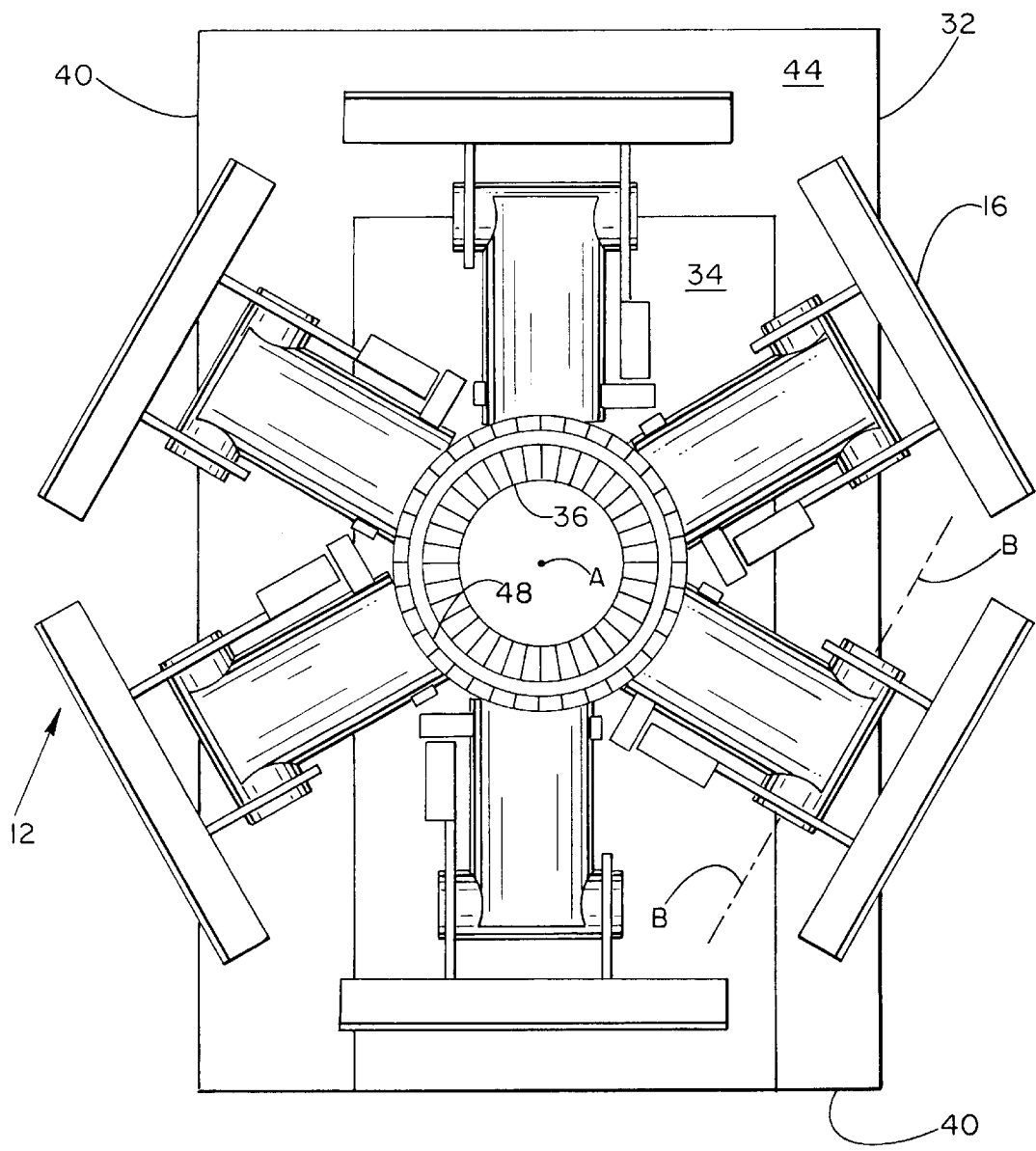
FIG. 3 is a front plan view of the reflecting unit of FIG. 2.
Figure 4:
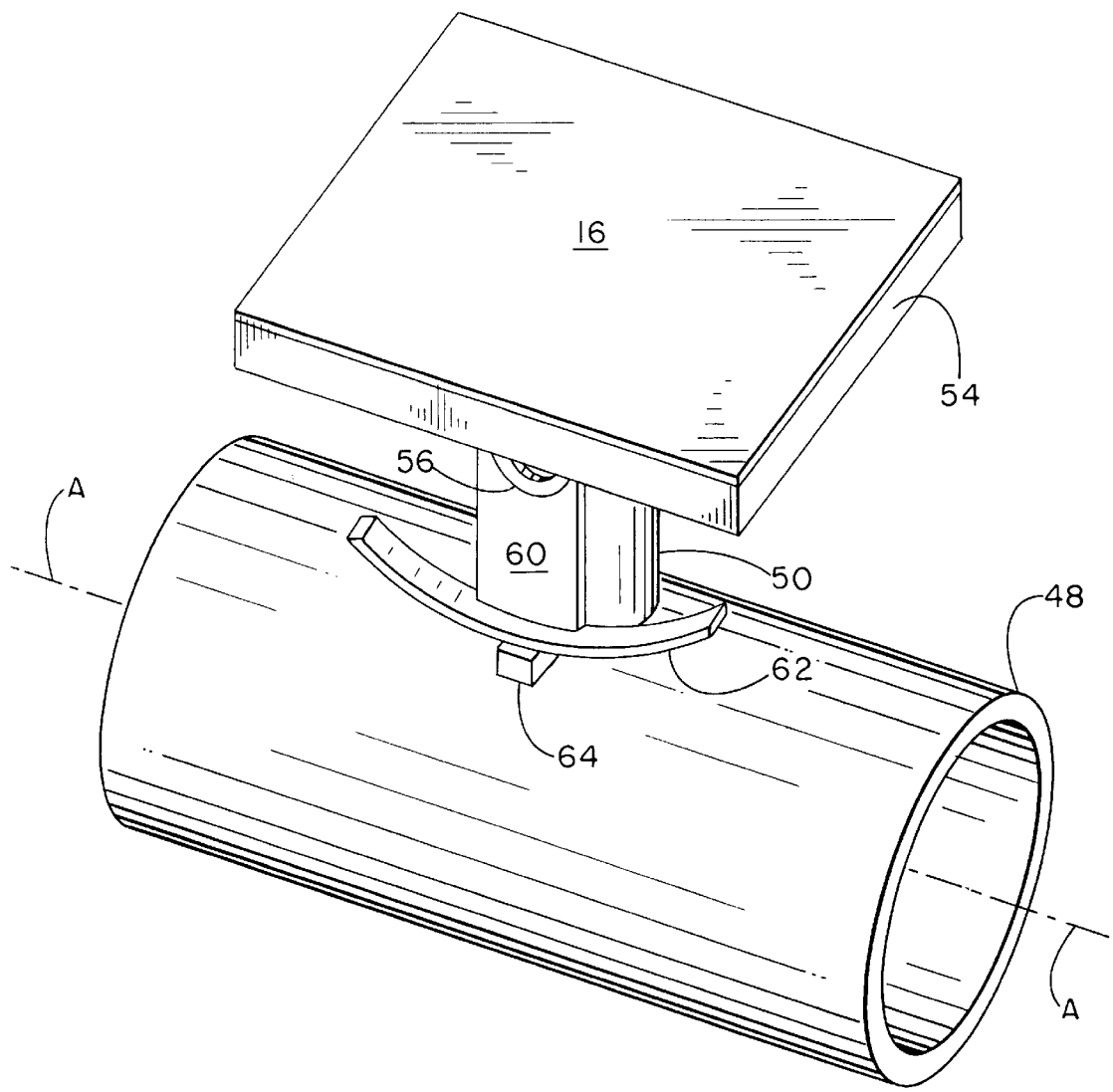
FIG. 4 is a perspective view of a reflecting subunit of the reflecting unit of FIGS. 2 and 3.
Figure 6:
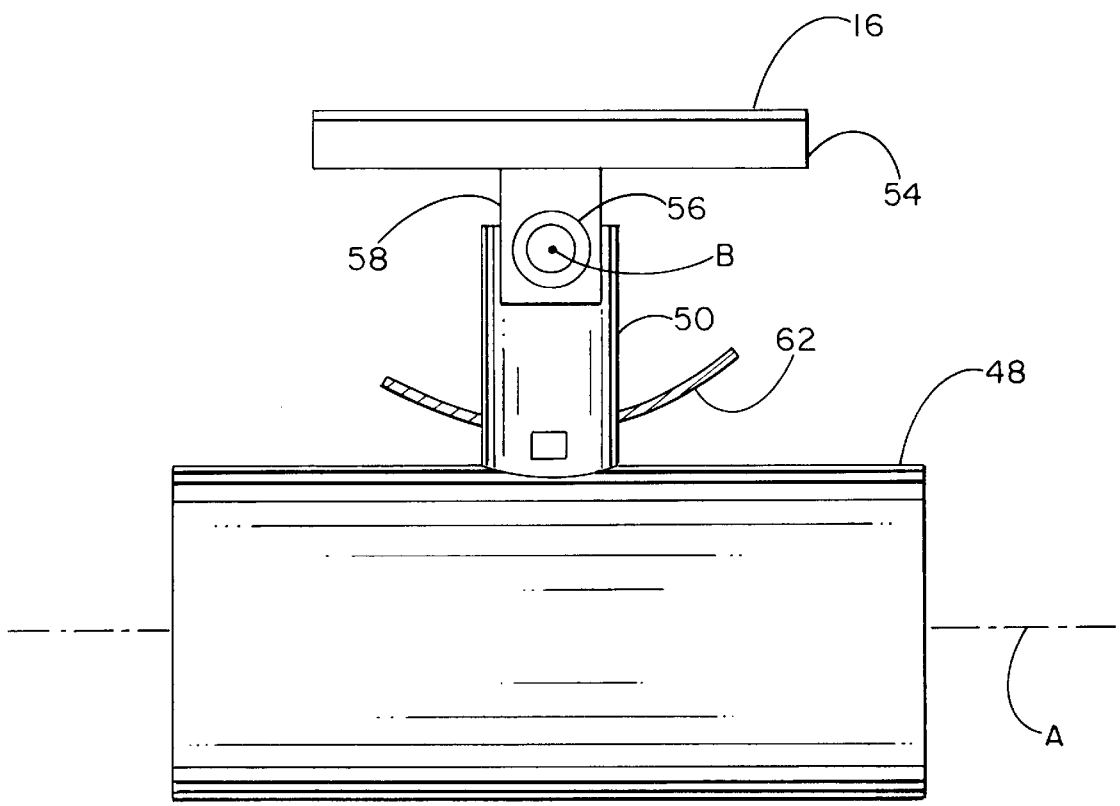
FIG. 6 shows the other side view of the reflecting subunit of FIG. 4.

FIGS. 2 and 3 show the reflecting unit 12 in greater detail. Each reflecting unit 12 includes a piece or building block 30 of the framework 18. Each piece 30 includes a first generally parallelepiped frame portion 32, a drive 34, and a cylindrical or tubular frame portion or core 36. Frame portions 32 and 36 are rigidly engaged to each other and each is formed of a network of a plurality of beams or trusses 38. Parallelepiped frame portion 32 includes four sides 40, each of which is engagable with another side 40 of another unit 12. Parallelepiped frame portion 32 further includes a rear side 42, opposite to a front side 44 to which is engaged the drive 34. Rear side 42 is engagable to a front end 46 of tubular frame portion 36 of another array 12. Accordingly, units 12 may be added to the array 10 over time, even after the array 12 has become functional.

Drive 34 is journaled on a large scale to a second tube 48 which in turn is rotationally engaged to tubular frame portion 36. Rotating second tube 48, like first stationary tube 36, is formed of beams or trusses similar to trusses 38. Drive 34 may include an electric motor powered by the solar collector 20. Relatively little energy is required to spin the second tube 48 since tube 48 spins at a relatively slow rate in view of the rather large distances between the array and the article upon which light is to be focused.

FIGS. 4, 5A, 5B, 6 and 7 show the reflecting subunit 16. Reflecting subunit 16 includes a spoke or support 50 rigidly fixed to the rotating second tube 48. Spoke or support 50, like second tube 48, is formed of beams or trusses similar to trusses 38. The number of spokes or supports 50, and thus the number of reflecting subunits 16, may depend upon a number of factors, such as cost. Six, or as explained below later, two, are two of the preferred numbers of spokes or supports 50.

A tilting mechanism 52 is engaged between the distal end of spoke or support 50 and a framework 54 for reflecting surface 16. Tilting mechanism 52 includes an axle or pivot 56. Framework 54 includes a passive bracket arm 58 and a driven bracket arm 60 pivotally engaged to the pivot 56. Driven bracket arm 60 at its distal arm is rigidly engaged to an arc segment 62. Arc segment 62 is driven by a drive 64 rigidly affixed to spoke or support 50. Drive 64 may extend through opposite wall portions of spoke or support 50. It should be noted that arc segment 62 and drive 64 schematically represent one of a number of mechanisms. For example, arc segment 62 and drive 64 may be a gear and toothed mechanism so as to tilt reflecting surface about the axis represented by pivot 56. Or arc segment 62 and drive 64 may include electromagnet mechanisms.

Each of the reflecting surfaces 16 is thus tiltable relative to two axis, a first axis A defined by the axis of rotating second tube 48 and a second axis B defined by pivot 56. Each of the units 12 is independently controllable about axis A; in other words, drive 34 is controlled independently relative to the other drives 34 so that each of the second tubes 48 may rotate at its own independent rate. Each of the drives 64 is independently controlled relative to each of the other drives 64 such that reflecting surface 16 is tiltable about axis B independently of each of the other reflecting surfaces 16 of its own respective unit 12 and independently of the other reflecting surfaces 16 of the entire array 10.

It should be noted that it is preferred that the distance between axis B and the reflective surface 16 be relatively short and that the distance between axis B and axis A be relatively long.

Figure 8:
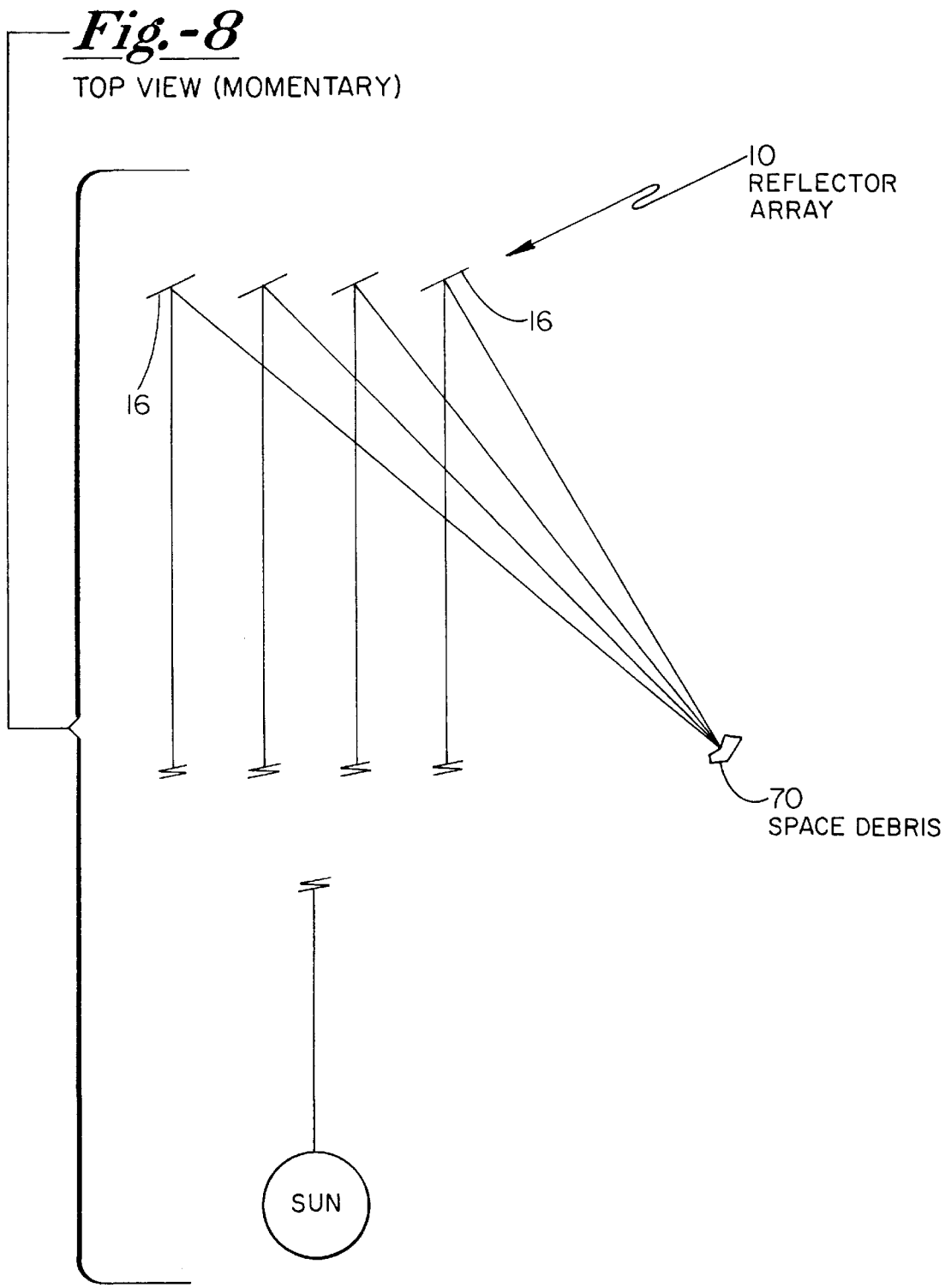
FIG. 8 shows a schematic top view of the reflector array focusing light on a piece of space debris at single moment in time.
Figure 10:
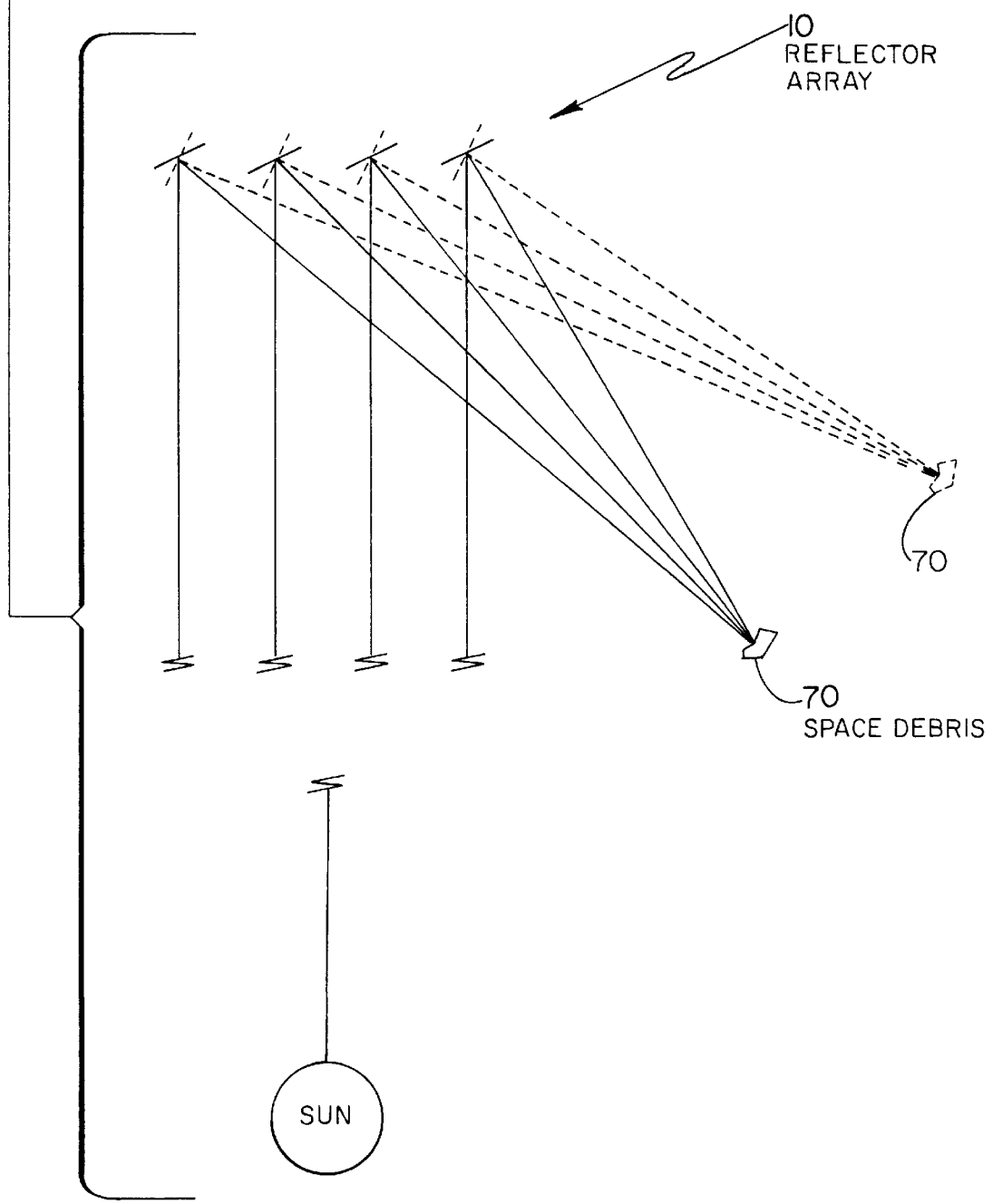
FIG. 10 shows a schematic top view of the reflector array focusing light on a piece of space debris and keeping such light on such debris over a period of time to heat up the debris over a rod of time.

FIG. 8 shows a top schematic view of the array 10 reflecting light from the sun onto a piece of space debris 70. FIG. 8 represents the tilt of the reflecting surface 16 about axis B as controlled be drive 64. FIG. 10 also shows a top schematic view and shows how reflective surface 16 tracks debris 70 relative to axis B over time so as to heat up the debris 70.

Figure 9:
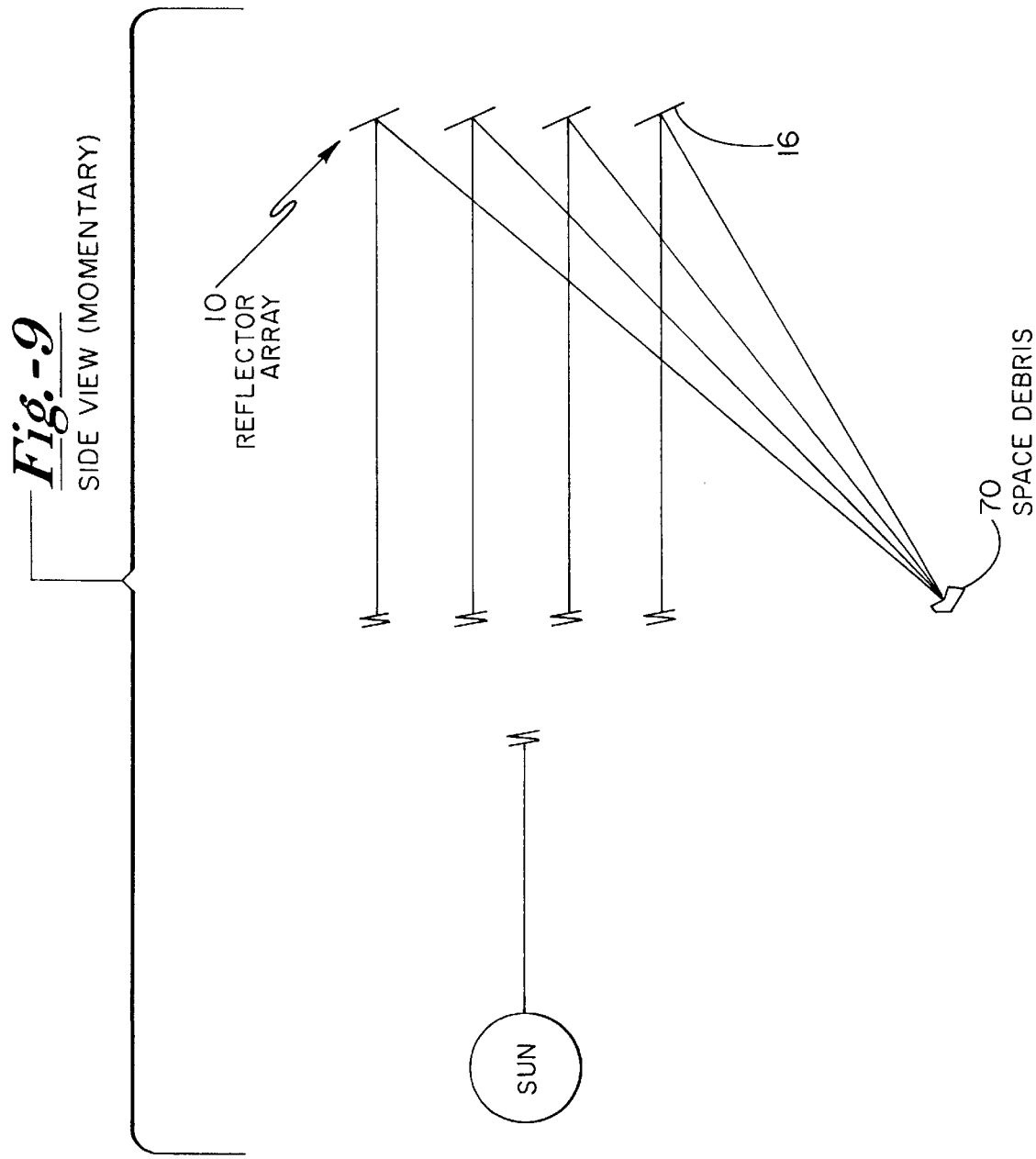
FIG. 9 shows a schematic side view of the reflector array focusing light on a piece of space debris at a single moment in time.
Figure 11:
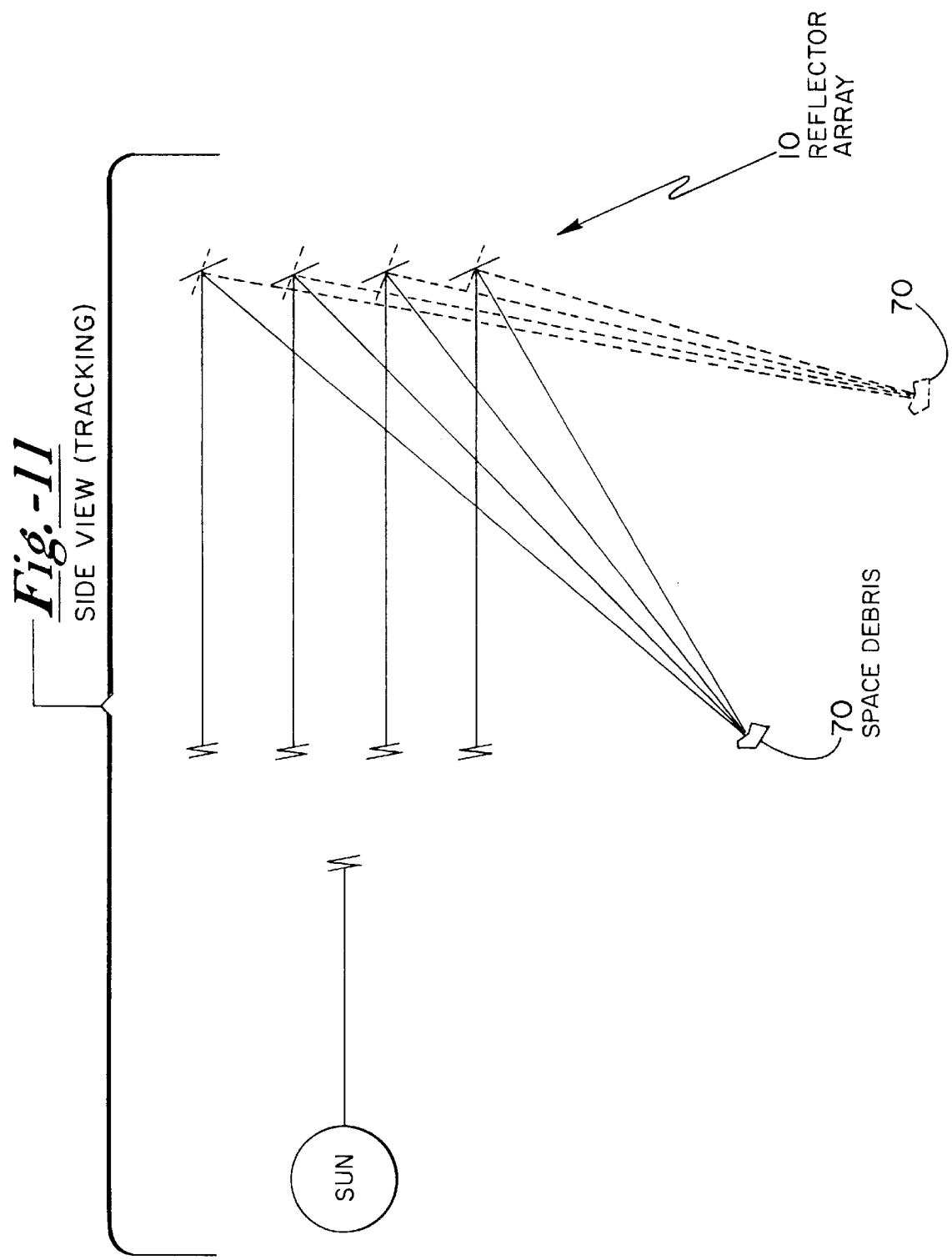
FIG. 11 shows a schematic top view of the reflector array focusing light on a piece of space debris and keeping such light on such debris over a period of time to heat up the debris over a period of time.

FIG. 9 shows a side schematic view of the array 10 reflecting light from the sun on the piece of space debris 70. FIG. 9 represents the tilt of the reflecting surface 16 about axis A as controlled by drive 34. FIG. 11 also shows a side schematic view and shows how reflective surface 16 tracks debris 70 relative to axis A over time so as to heat up the debris 70.

It should be noted that a third axis is controlled by the gyroscopes 22. It should be noted that this third axis may be one of a plurality of axis. Also the gyroscopes keep axis A and B stabilized in space until the third axis is changed.

Figure 12:
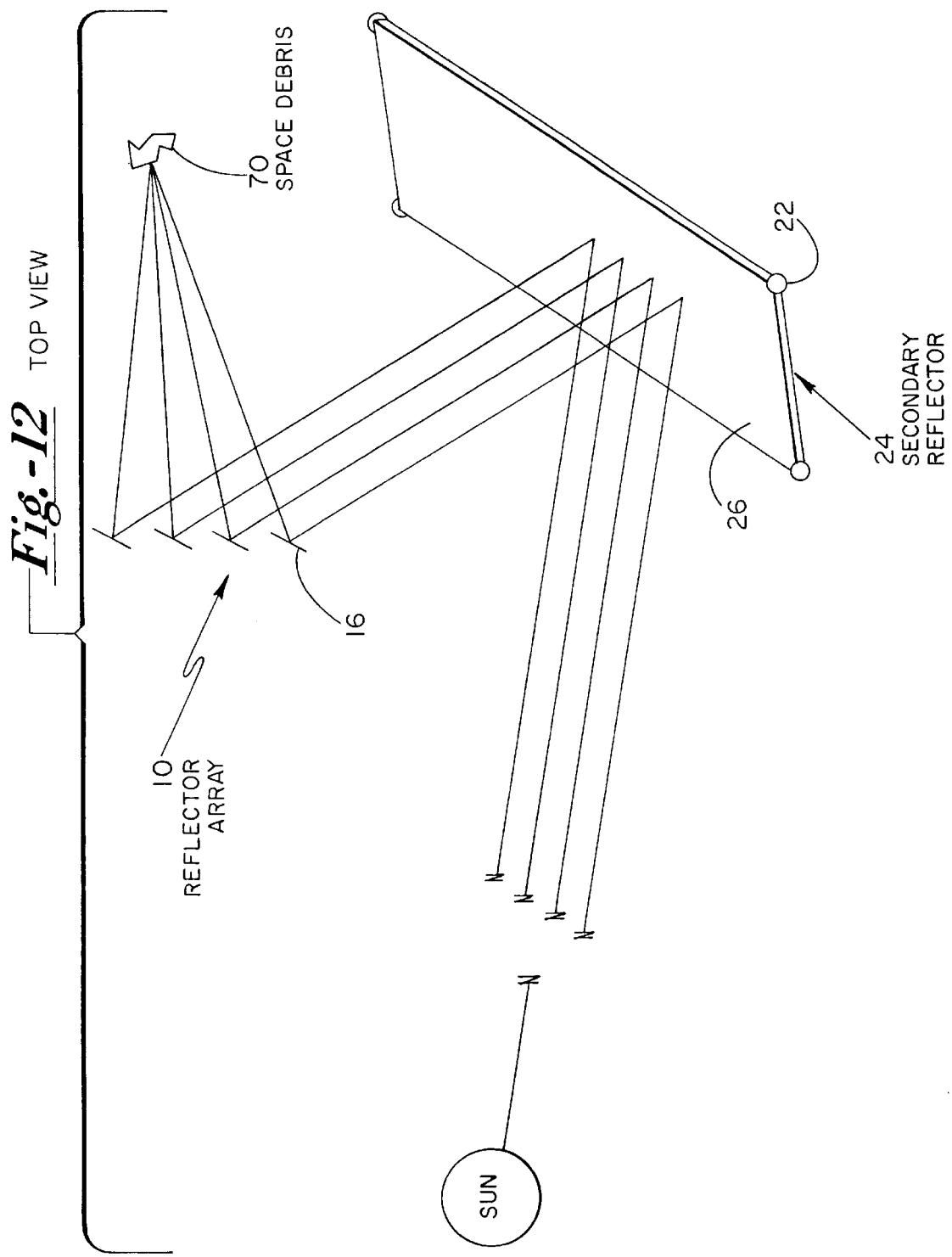
FIG. 12 shows a schematic top view and indicates the light path from the sun, to the secondary reflector, to the reflecting array, to a piece of space debris.
Figure 13:
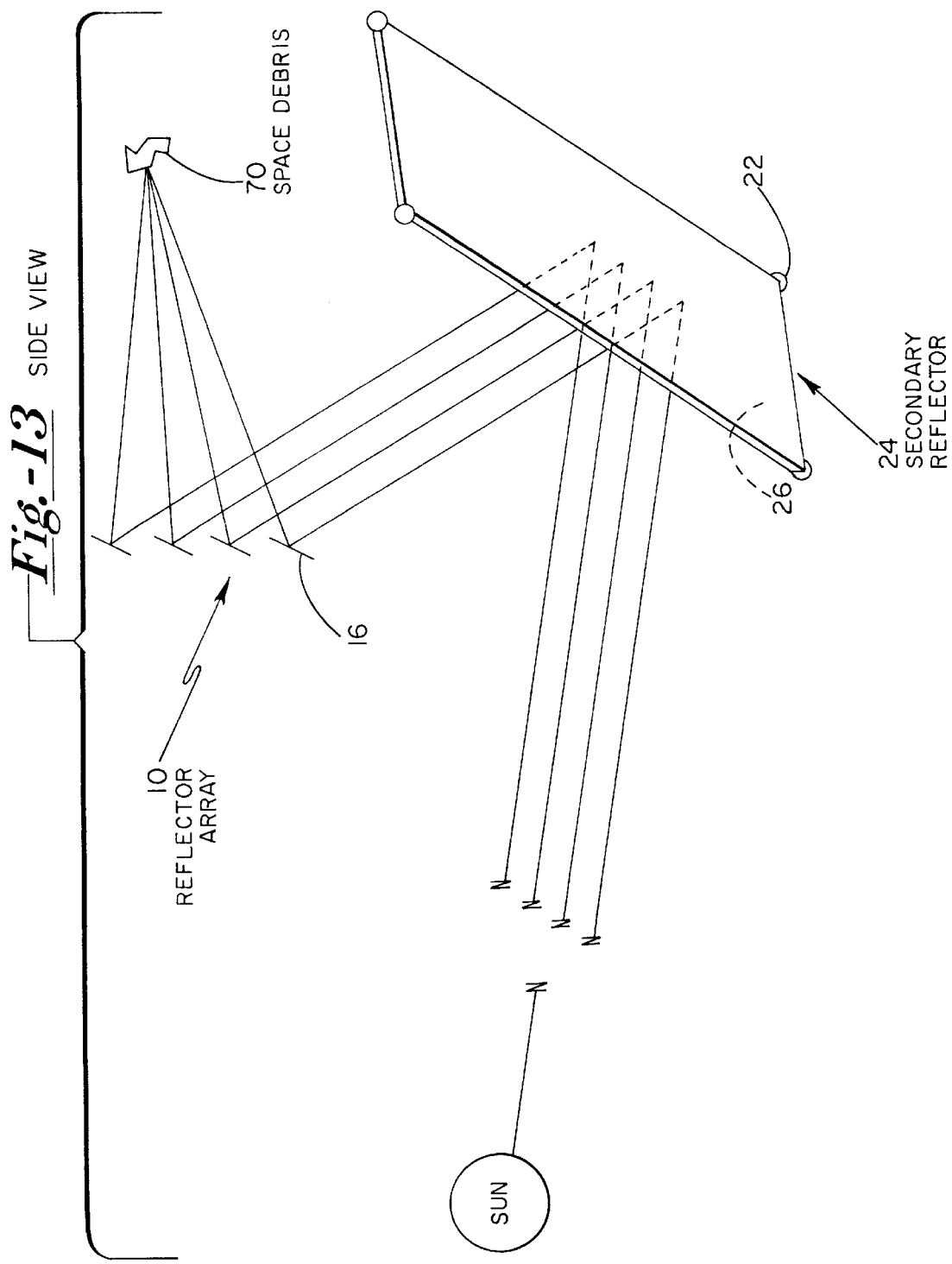
FIG. 13 shows a schematic side view and indicates the light path from the sun, to the secondary reflector to the reflecting array, to a piece of space debris.

As shown in FIGS. 12 and 13, reflective array 10 is preferably a thickness of one unit 12 such that one reflective surface 16 may be reflecting rays coming directly from the sun and such that an opposite reflective surface 16 may be reflecting rays coming from secondary reflective structure 24 to heat up debris 70 when such debris 70 is positioned directly opposite of the sun, i.e. when the primary reflective array 10 is between the debris 70 and the sun.

It should be noted that the reflecting surfaces 16 and 26 is preferably a polished metal surface. Surfaces 16 and 26 need not be continuous. Surfaces 16 and 26 are merely schematic representations. Continuous polished surfaces may not be preferable; such surfaces may collect too much heat and warp thus reducing accuracy.

The reflective array 19 as indicated in FIG. 1 may be about one-half mile in width and about one-half mile in height. Reflective surface 16 may be about 250 yards in length.

It should be noted that the array 10 further includes communication systems for control by a party on Earth, radar systems for picking up the presence of space debris 70, computer systems for independent control of the drives 34 and 64.

It should be noted that reflecting surface 16 may be both spinning about axis A and tilting about axis B at the same time, and further at the same time may be rotating about an axis controlled by the gyroscopes 22.

It should be noted that, since the drives 34 and 64 are independently controlled, array 10 may send out multiple focus points, i.e., array 10 may heat up several pieces of space debris 70 at one time.

Reflective surfaces 16 and 26 are preferably flat since flat surfaces are less expensive to manufacture than parabolic or curved polished surfaces and more suited to three dimensional focusing.

Figure 14:
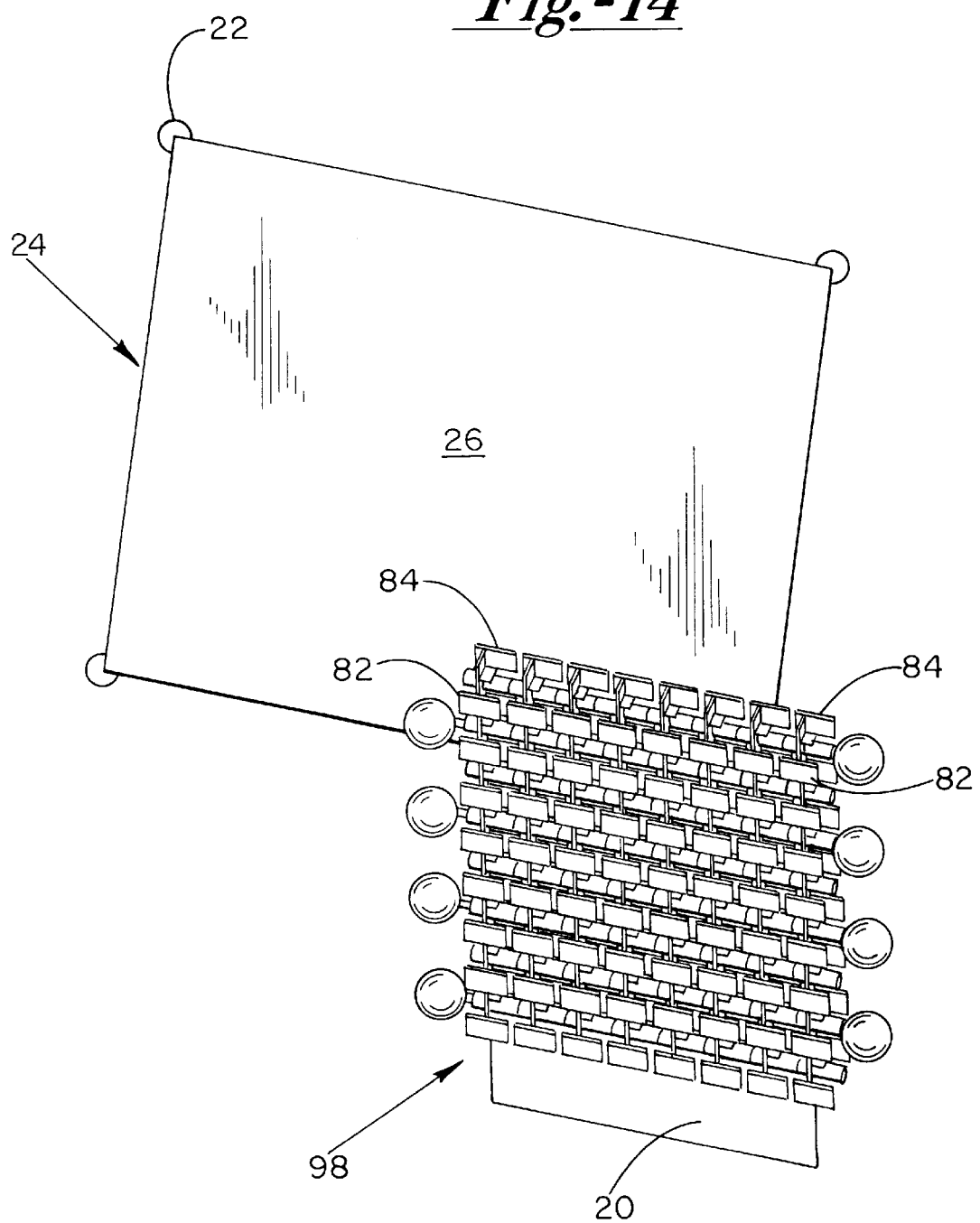
FIG. 14 shows a partially schematic, partially perspective view of a different embodiment of the reflecting array of FIG. 1.
Figure 15:
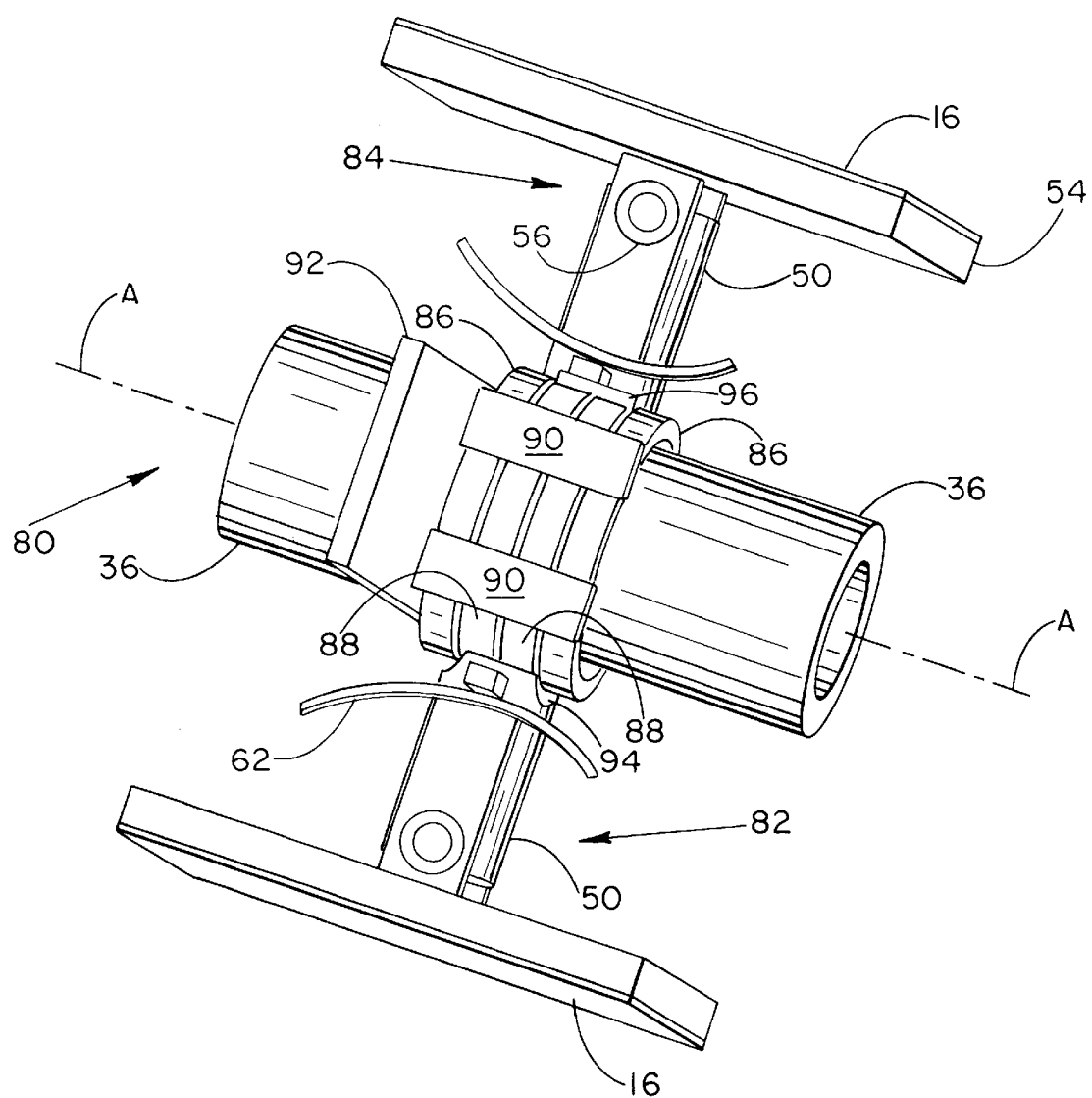
FIG. 15 shows a perspective view of a reflecting unit of the reflecting array of FIG. 14.

In another embodiment of the invention, as shown in FIGS. 14 and 15, a unit 80 may include paired subunits 82, 84. Each of the subunits 82, 84 is identical to subunit 12 except that subunits 82, 84 are independently controlled about axis A by being mounted on different sets of rings. Subunit 84 is mounted on outer rings 86 and subunit 82 is mounted on inner rings 88. Rings 86 and 88 rotate about rigid core 36 and are driven by drives 90, which are rigidly engaged to a structural frame portion 92, which in turn is rigidly engaged to core 36. Spoke or support 50 of subunit, 82 includes outer cutout portions 94 to permit bypass of outer rings 86. Spoke or support 50 of subunit 84 includes an inner cutout portion 96 to permit bypass of inner rings 88.

With the provision of paired subunits 82 and 84 which may be rotated in opposite directions, unit 80 may be operated to provide no net forces to an array 98 having the units 80. In other words, when one subunit 82 is rotated in one direction about axis A, the other subunit 84 is rotated at the same rate and in the diametrically opposite direction to cancel out the forces of the rotation of subunit 82. Further, when the reflecting surface 16 of one of the subunits 82 or 84 is tilted about axis B, the reflecting surface 16 of the other subunit 82 or 84 is tilted in the opposite direction at the same rate and at the same time to cancel out the forces caused by the tilting of the first mentioned reflecting surface. It should be noted that it is preferred if subunits 82 and 84 are operated so as to cancel out the forces created by the operation of each. Additionally if one of the motors becomes inoperative, the corresponding counterpart can be decommissioned with little diminution of the overall capability of the array.

Further, as shown in FIG. 14, the reflective array 98 having units 80 may thus heat up and track multiple space debris 70 on each of the front and back sides of the array 98 at the same time presumably by using one-half of each side thus allowing net motion cancellation over the array. More options are now available because each of the reflective surfaces 16 is now independent of each of the other reflective surfaces 16 of its own unit 80 and also independently controllable relative to each of the other reflective surfaces 16 of the other units 80 of the array 98. Where multiple debris 70 are being heated up by utilizing a portion of the array on each side, it is possible to have paired subunits 82 and 84 cancel each other out, and in such a case, the gyroscopes 22 may or may not be operated to keep the array 22 stabilized.

Figure 7:
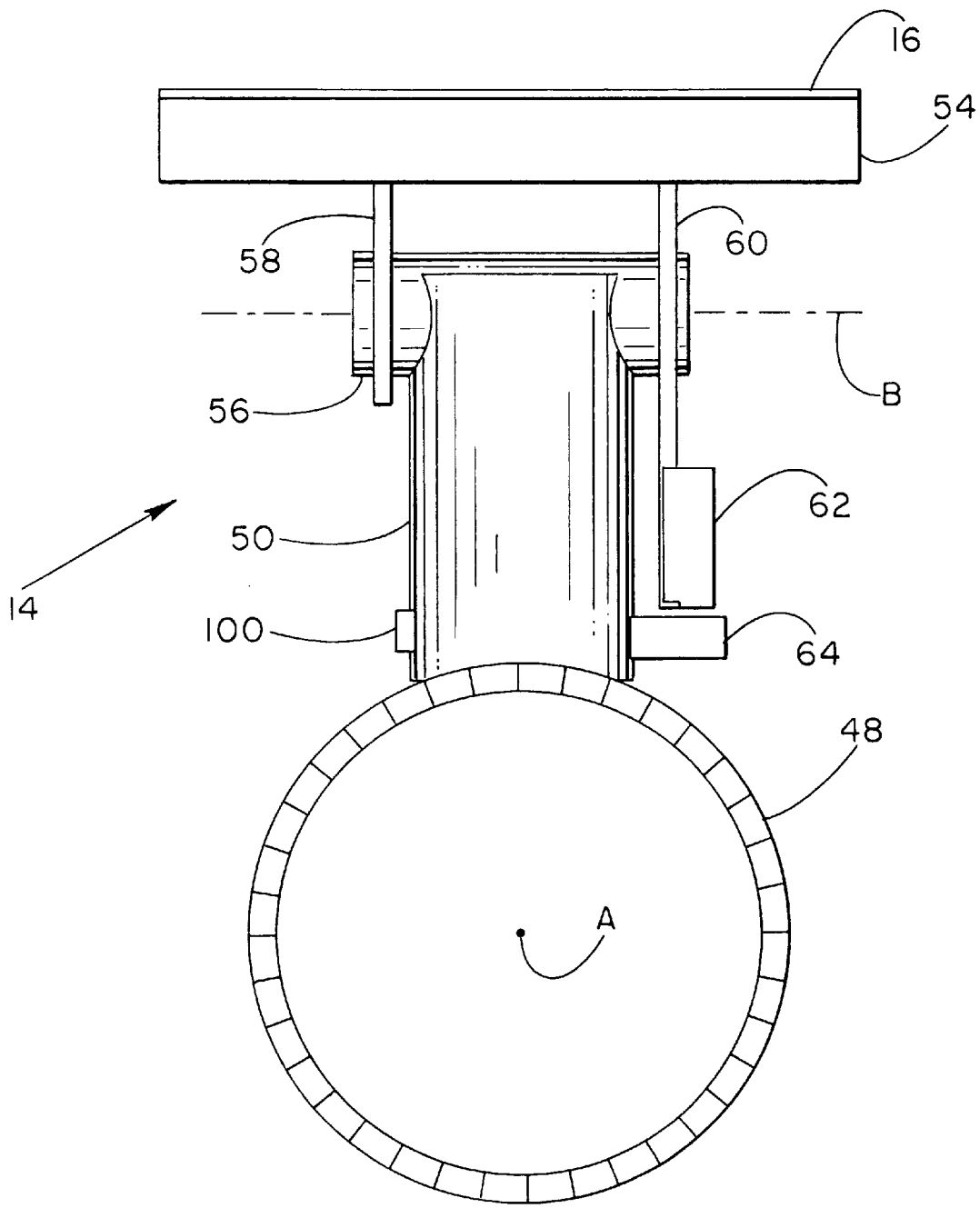
FIG. 7 shows a detail front plan view of the reflecting subunit of FIG. 4.

Reference numeral 100 in FIG. 7 indicates a means to double check position of the subunit 14 relative to the array 10. Such means may be computerized, magnetic, motion, optical, etc.

Rechargeable rocket thrusters may be affixed to the array 10, such as on the corners, to counteract the effect of gravity and solar wind. Such thrusters may also be on the secondary reflector 24.

Thus since the invention disclosed herein may be embodied in other specific forms without departing from the spirit or general characteristics thereof some of which forms have been indicated, the embodiments described herein are[ ]to be considered in all respects illustrative and not restrictive. The scope of the invention is to be indicated by the appended claims, rather than by the foregoing description, and all changes which come within the meaning and range of equivalents of the claims are intended to be embraced therein.

I claim:

1. A reflector for reflecting rays of the sun, with the reflector being in orbit about a celestial body, with the reflector comprising, in combination:
  a) a reflecting unit, with the reflecting unit comprising:
    i) a respective first axis about which the reflecting unit is rotatable;
    ii) a set of reflecting subunits arranged about the first axis, with each of the reflecting subunits having a second axis generally perpendicular to the first axis about which each of said subunits is tiltable; and
    iii) a reflecting surface on each of the subunits facing outwardly relative to the first respective axis and second respective axis of its respective subunit such that rotation of the reflecting unit about the first axis changes an impingement angle of sunlight on the reflecting surfaces facing the sun and such that tilting each of the subunits further changes the impingement angle of sunlight on the reflecting surfaces facing the sun;
  b) an array of the reflecting units to provide for a plurality of reflecting subunits, with each of the reflecting units being independently controllable such that each of the reflecting units is independently rotatable about its respective first axis and such that each of the subunits is independently controllable such that each of the reflecting surfaces is independently tiltable relative to each of the other reflecting surfaces such that reflected sunlight may be focused onto a single location and object at said single location and may continue to focus sunlight on said object as said object moves; and
  c) at least one gyroscope on the array for maneuvering the array generally in the direction of the single location and generally stabilizing the array.

2. The reflector according to claim 1 wherein the subunits lie generally in a common plane about the first axis.

3. The reflector according to claim 1 wherein each of the reflecting surfaces includes opposing edges, with each of the opposing edges confronting an opposing edge of an adjacent reflecting surface such that the reflecting surfaces generally form a periphery of the reflecting unit.

4. The reflector according to claim 1 wherein each of the reflecting subunits comprises a spoke radiating from the first axis, with each of the spokes having a proximal end directed at the first axis and a distal end, with each of the distal ends having mounted thereon a tiltable structure having the reflecting surface and being tiltable about the second axis of its respective subunit, with the spokes lying generally in a common plane.

5. The reflector according to claim 1 wherein each of the reflecting surfaces is generally planar.

6. The reflector according to claim 1 wherein the array includes a front side facing the sun and a rear side facing away from the sun such that the reflecting surfaces face out the front side and rear side during rotation of the reflecting unit, and further comprising a reflecting structure having a planar reflective face, with the reflecting structure positioned at a greater distance from the sun than the reflector and further being offset from a line between the reflector and the sun such that the planar reflective face may reflect sunlight onto the rear side of the array such that twice reflected sunlight may be focused onto a single location behind the array.

7. The reflector according to claim 6 and further comprising a gyroscope on the reflecting structure to generally position the reflecting structure and to generally stabilize the reflecting structure.

8. A reflector for reflecting rays of the sun, with the reflector being in orbit about a celestial body, with the reflector comprising, in combination:
 a) a reflecting unit, with the reflecting unit comprising:
  i) a respective first axis about which the reflecting unit is rotatable;
  ii) a set of reflecting subunits arranged about the first axis, with each of the reflecting subunits having a second axis generally perpendicular to the first axis about which each of said subunits is tiltable; and
  iii) a reflecting surface on each of the subunits facing outwardly relative to the first respective axis and second respective axis of its respective subunit such that rotation of the reflecting unit about the first axis changes an impingement angle of sunlight on the reflecting surfaces facing the sun and such that tilting each of the subunits further changes the impingement angle of sunlight on the reflecting surfaces facing the sun;
 b) wherein each of the subunits is independently controllable such that each of the reflecting surfaces is independently tiltable relative to each of the other reflecting surfaces;
 c) wherein the subunits lie generally in a common plane about the first axis;
 d) wherein each of the reflecting surfaces includes opposing edges, with each of the opposing edges confronting an opposing edge of an adjacent reflecting surface such that the reflecting surfaces generally form a periphery of the reflecting unit;
 e) wherein each of the reflecting surfaces is generally planar;
 f) further comprising an array of the reflecting units to provide for a plurality of reflecting units, with each of the reflecting units being independently controllable such that each of the reflecting units is independently rotatable about its respective first axis and such that each of the subunits is independently controllable such that each of the reflecting surfaces is independently tiltable relative to each of the other reflecting surfaces such that sunlight may be focused onto a single location and object at said single location and may continue to focus sunlight on said object as said object moves, wherein the array includes a front side facing the sun and a rear side facing away from the sun such that the reflecting surfaces face out the front side and rear side during rotation of the reflecting unit; and
 g) a reflecting structure having a planar reflective face, with the reflecting structure positioned at a greater distance from the sun than the reflector and further being offset from a line between the reflector and the sun such that the planar reflective face may reflect sunlight onto the rear side of the array such that sunlight may be focused onto a single location behind the array.

9. A reflector for reflecting rays of the sun, with the reflector being in orbit about a celestial body, with the reflector comprising, in combination:
 a) a reflecting unit, with the reflecting unit comprising:
  i) a respective first axis about which the reflecting unit is rotatable;
  ii) a set of reflecting subunits arranged about the first axis, with each of the reflecting subunits being independently rotatable about the first axis, with each of the reflecting subunits having a second axis generally perpendicular to the first axis, with each of the reflecting subunits being tiltable about the second axis;
  iii) with the subunits comprising at least two subunits paired with each other, with rotation about the first axis by one subunit being countered by rotation in an opposite direction by the other subunit such that a net force of rotation about the first axis is zero, with tilting about a respective second axis by one subunit being countered by tilting about a respective second axis by the other subunit such that a net force of rotation about the second axis is zero; and
  iv) a reflecting surface on each of the subunits facing outwardly relative to the first respective axis and second respective axis of its respective subunit such that rotation of the reflecting unit about the first axis changes an impingement angle of sunlight on the reflecting surfaces facing the sun and such that tilting each of the subunits further changes the impingement angle of sunlight on the reflecting surfaces facing the sun.

10. The reflector according to claim 9 and further comprising an array of the reflecting units to provide for a plurality of reflecting subunits, with the array having a front side and a rear side, with a portion of the subunits being operated on one side of the array, and with a portion of the subunits being operated on the other side of the array such that opposite portions of the array counter movement of the portions of the array which are operating.

11. A reflector for reflecting rays of the sun, with the reflector being in orbit about a celestial body, with the reflector comprising, in combination:
 a) a reflecting unit, with the reflecting unit comprising:
  i) a respective first axis about which the reflecting unit is rotatable;
  ii) a set of reflecting subunits arranged about the first axis, with each of the reflecting subunits having a second axis generally perpendicular to the first axis about which each of said subunits is tiltable; and
  iii) a reflecting surface on each of the subunits facing outwardly relative to the first respective axis and second respective axis of its respective subunit such that rotation of the reflecting unit about the first axis changes an impingement angle of sunlight on the reflecting surfaces facing the sun and such that tilting each of the subunits further changes the impingement angle of sunlight on the reflecting surfaces facing the sun;
 b) an array of the reflecting units to provide for a plurality of reflecting subunits, with each of the reflecting units being independently controllable such that each of the reflecting units is independently rotatable about its respective first axis and such that each of the subunits is independently controllable such that each of the reflecting surfaces is independently tiltable relative to each of the other reflecting surfaces such that reflected sunlight may be focused onto a single location and object at said single location and may continue to focus sunlight on said object as said object moves, wherein the array includes a front side facing the sun and a rear side facing away from the sun such that the reflecting surfaces face out the front side and rear side during rotation of the reflecting unit;

c) a gyroscope on the array for maneuvering the array and for generally stabilizing the array;

d) a reflecting structure having a planar reflective face, with the reflecting structure positioned at a greater distance from the sun than the reflector and further being offset from a line between the reflector and the sun such that the planar reflective face may reflect sunlight onto the rear side of the array such that twice reflected sunlight may be focused onto a single location behind the array; and e) a gyroscope on the reflecting structure for maneuvering the reflecting structure and for generally stabilizing the reflecting structure.

12. A reflector for reflecting rays of the sun, with the reflector being in orbit about the Earth, with the reflector that is moving in orbit about the Earth capable of reflecting rays of the sun upon multiple moving focus points at the same time, with the reflector comprising, in combination:

a) a reflecting surface,
   i) with the reflecting surface comprising a first axis about which the reflecting surface is rotatable;
   ii) with the reflecting surface comprising a second axis generally perpendicular to the first axis, with the reflecting surface being rotatable about said second axis; and
   iii) with rotation of the reflecting surface about the first axis changing an impingement angle of sunlight on said reflecting surface and with rotation of the reflecting surface about the second axis further changing the impingement angle of sunlight on said reflecting surface such that the reflecting surface is adjustable to reflect rays of the sun upon one moving point;

b) an array of the reflecting surfaces to provide for a plurality of reflecting surfaces, with first axis rotation of each of the reflecting surfaces being controllable independently of each of the other reflecting surfaces and with second axis rotation of each of the reflecting surfaces being controllable independently of each of the other reflecting surfaces such that each of the reflecting surfaces is independently adjustable such that the array may focus the rays of the sun upon multiple moving focus points at the same time, wherein the array includes a frame and wherein each of the reflecting surfaces is mounted to the frame; and c) at least one gyroscope on the array for maneuvering the array generally in the direction of one of the multiple moving focus points and for generally stabilizing the array.

13. The reflector according to claim 12, wherein the array includes a front side facing the sun and a rear side facing away from the sun, wherein each of the front and rear sides includes a plurality of the reflecting surfaces, and further comprising a reflecting structure having a planar reflective face, with the reflecting structure positioned at a greater distance from the sun than the reflector and further being offset from a line between the reflector and the sun such that the planar reflective face may reflect sunlight onto the rear side of the array such that twice reflected sunlight may be focused onto a single location behind the array.

14. The reflector according to claim 12, wherein the array includes a front side facing the sun and a rear side facing away from the sun, wherein each of the front and rear sides includes a plurality of the reflecting surfaces, with each of the reflecting surfaces of the front side being paired with one of the reflecting surfaces on the rear side, with rotation about one axis of one reflecting surface being countered by rotation of the respective paired reflecting surface such that a net force of rotation about said one axis is zero.

* * * * *